June 20, 1961    H. A. WOLTER ET AL    2,989,090
CHARCOAL SETTLING CONVEYOR
Filed April 18, 1958    2 Sheets-Sheet 1
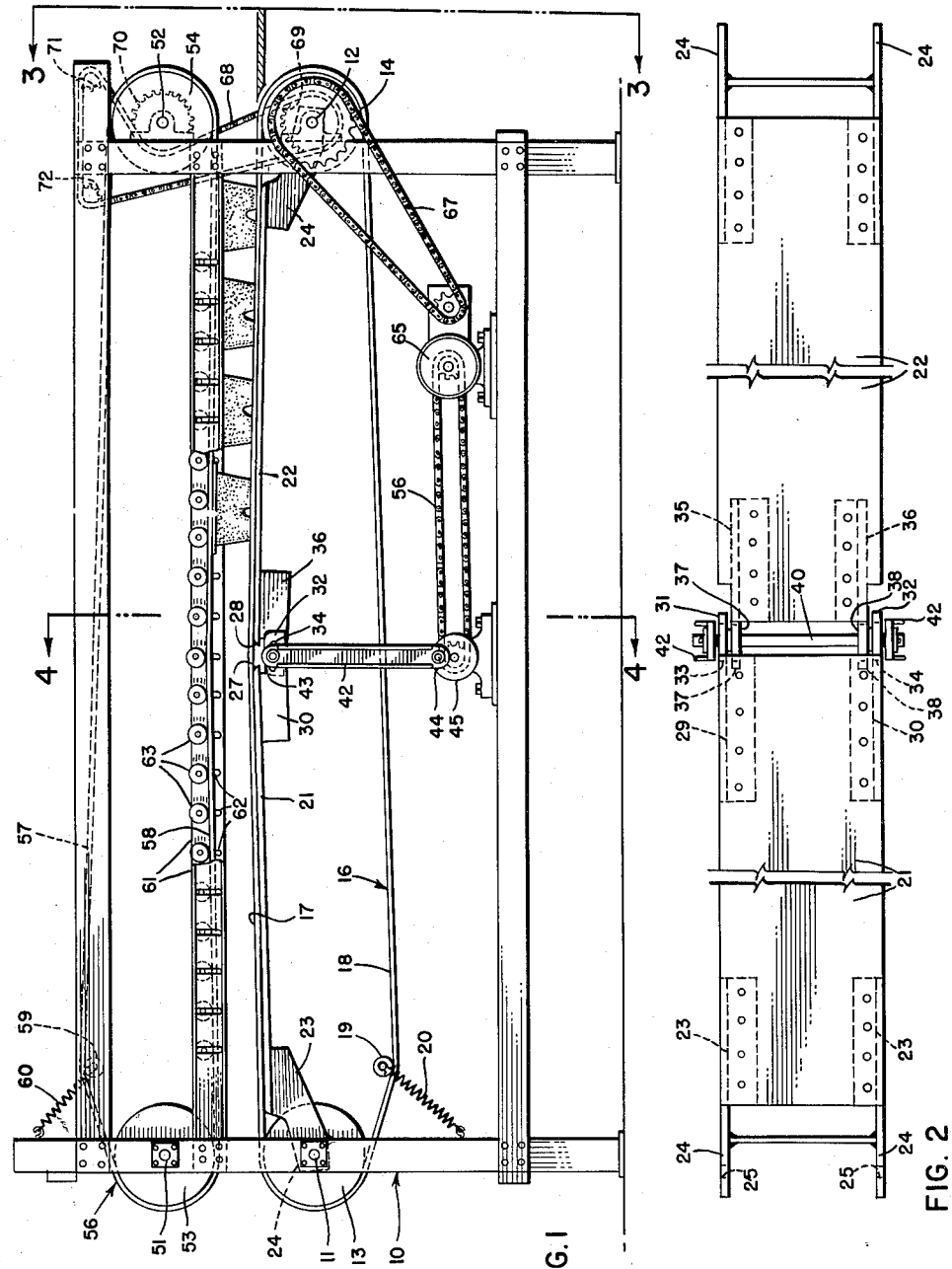
INVENTORS
Harry A. Wolter
Thomas N. Bushey
BY Karl W. Flocks
ATTORNEY

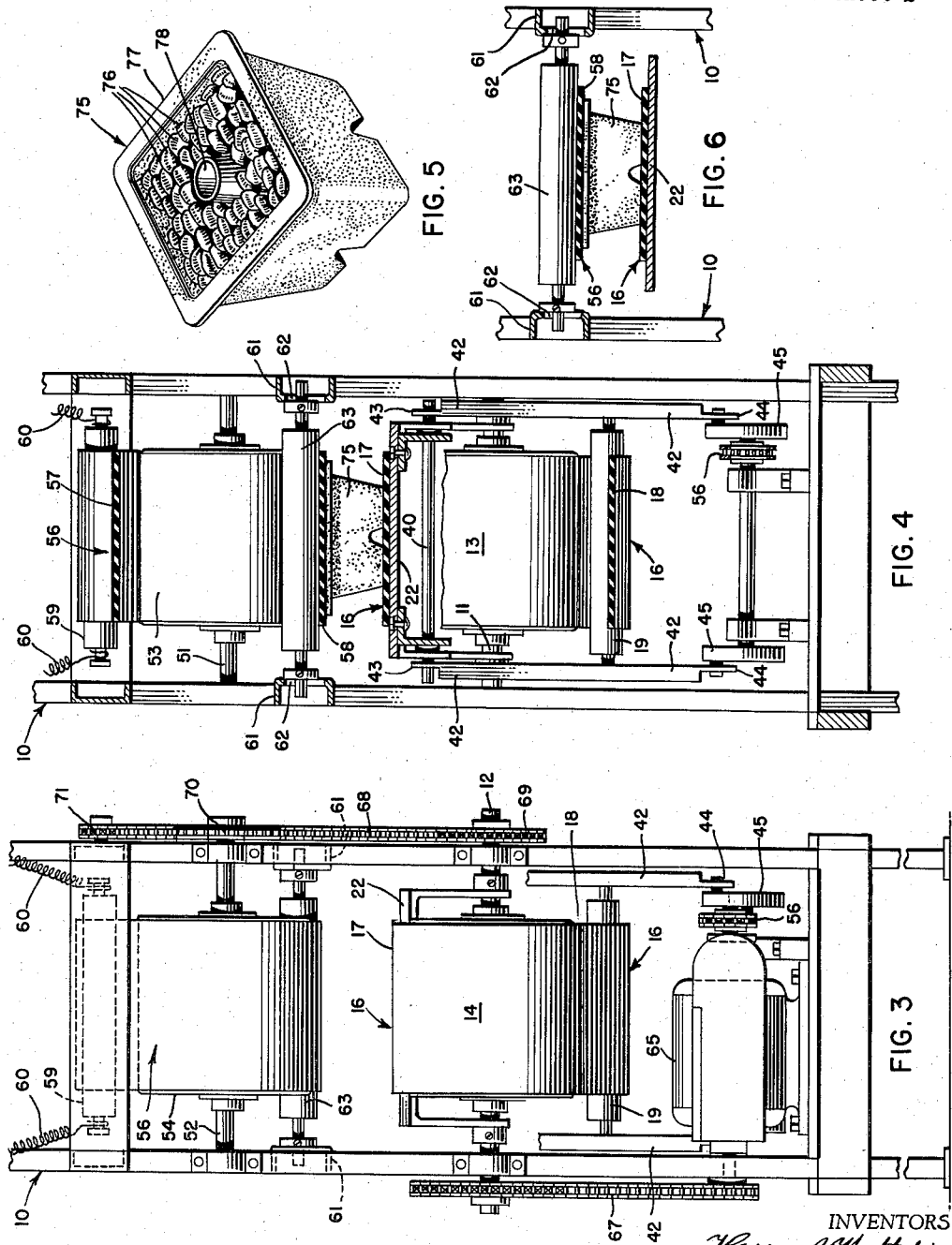

United States Patent Office 2,989,090
Patented June 20, 1961

2,989,090
CHARCOAL SETTLING CONVEYOR
Harry A. Wolter, Akron, and Thomas N. Bushey, Copley, Ohio, assignors to Diamond National Corporation, a corporation of Delaware
Filed Apr. 18, 1958, Ser. No. 729,352
14 Claims. (Cl. 141—12)

The present invention relates to a method of and apparatus for oscillating or vibrating a container having material therein and for exerting a downward force on any material in the container which extends above the upper rim of the container.

In the packaging of certain materials, such as the packaging of charcoal briquettes in a substantially rigid container, which is preferably made of molded pulp, it is desirable to place a predetermined weight of charcoal in the container. When using modern weighing and filling apparatus, it is the practice to discharge such charcoal into a container which, generally speaking, is moving along a path; the container may be slowed down or not at the filling station of the apparatus, but in any event it is necessary to fill the container with the predetermined weight of material as rapidly as possible. When this is done, the charcoal in most cases will not fall into position in the container so that all of the charcoal is below the level of the upper rim of the container. Hence, for the container as thus filled to be passed to apparatus for placing a lid on it, great difficulty would be encountered due to the fact that the lid could not be suitably placed upon the container, but would be prevented from engaging the upper rim of the container by the upwardly extending charcoal.

While prior art apparatus and methods are known in which a container either filled or partially filled with a material is vibrated or oscillated to settle the material, such apparatus has generally dealt with either granular materials or with such objects as matches. Such materials, due to their shape, form and/or weight have been relatively amenable to being vibrated; thus the prior art apparatus and methods were satisfactory for the materials there being packaged. However, with the packaging of charcoal it has been found that simply vibrating or oscillating the container with the charcoal in it has not proven to be satisfactory because the charcoal would not settle sufficiently if the vibrations imparted to the container were relatively gentle, and on the other hand if more vigorous vibration were applied to the container it was found that the charcoal would be impelled from the container.

An object of the present invention is to provide a method of and apparatus for vibrating a container while applying a downward force to any material extending above the upper rim of the container.

Another object of the present invention is the provision of a method and apparatus for vibrating a container through oscillations of successively increasing and decreasing amplitude while exerting a substantially constant force on the top of any material extending above the upper rim of the container.

Still another object of the present invention is to provide a method of and apparatus for vibrating a container filled with a predetermined weight of charcoal briquettes so as to settle the briquettes below the level of the upper rim of the container.

A further object of the present invention is the provision of a method and apparatus for vibrating a container filled with a predetermined weight of charcoal briquettes so as to settle the briquettes below the upper rim of the container and without danger of impelling briquettes from the container.

Other objects and the nature and advantages of the instant invention will be apparent from the following description taken in conjunction with the accompanying drawings, where:

FIG. 1 is an elevational view, with parts removed, of one form of realization of the method and apparatus of the invention;

FIG. 2 is a plan view of oscillating plates shown in FIG. 1;

FIG. 3 is an elevational view taken on the line 3—3 of FIG. 1;

FIG. 4 is a sectional view taken on the line 4—4 of FIG. 1;

FIG. 5 is a perspective view of a preferred form of container with charcoal therein as it appears before being placed in the instant apparatus and subjected to the instant method; and FIG. 6 is an end view of the container of FIG. 5 passing through the apparatus.

Referring now to the drawings, wherein like reference characters are used to designate like or corresponding parts throughout several views, there is shown in FIG. 1 a frame 10 having shafts 11 and 12 mounted therein, these shafts being at opposite ends of the frame 10 and in approximately the same horizontal plane. A pulley 13 is journalled on the shaft 11 and a similar pulley 14 is journalled on the shaft 12. It will be understood that if desired the shafts may be journalled in the frame and the pulleys fixed to the shafts. A conveyor belt 16 having an upper run 17 and a lower run 18 is trained over the pulleys 13 and 14. An idler pulley 19 rests on the upper surface of the lower run of the belt 16 and a pair of springs 20, only one of which is shown, is secured to the idler pulley 19 and to the frame 10 below the level of the lower run. Thus, idler pulley 19 and the springs 20 serve to take up the slack in the belt 16 and to keep it constantly under tension.

A pair of plates 21 and 22 underlie and support the upper run 17 of conveyor 16, and as each of these plates is substantially identical to the other, only one will be described in detail. Plate 21 has secured to the left side thereof as shown in FIG. 1 a depending bracket 23 having a pair of extending ears 24 with aligned apertures 25 therein. The shaft 11 extends through the apertures 25 to thus pivotally support the plate 21. The ears 24 are sufficiently widespread that they pass on the outside of the pulley 13. The free end 27 of the plate 21 is in facing relationship with the free end 28 of the plate 22, and these free ends are at approximately the midway point between the shafts 11 and 12. Fittings 29 and 30 are secured to the under side of plate 21 and have extending ends 31 and 32, respectively, having slots 33 and 34 therein. Fittings 35 and 36 are secured to the underside of plate 22 and have extending ends 37 and 38 with slots therein. As shown most clearly in FIG. 2, the ends 37 and 38 of fittings 35 and 36 lie between the ends 31 and 32 of fittings 29 and 30. A pin 40 extends through the aforementioned slots and is secured therein by any suitable means.

A pair of links 42 have their upper ends 43 journalled to receive the pin 40 (see FIG. 4). The lower ends 44 of the links 42 are journalled to crank 45 beneath the frame 10.

Above the shaft 11 a shaft 51 is fixed in the frame 10 and above the shaft 12, a shaft 52 is fixed in the frame 10. A pulley 53 is journalled on the shaft 51 and a pulley 54 is journalled on shaft 52. About the pulleys 53 and 54 there is trained a belt 56 having an upper run 57 and a lower run 58. An idler pulley 59 engages with the underside of the upper run 57 of the belt 56 and a pair of springs 60, only one of which is shown, is secured to the idler pulley 59 and to the frame 10 above the upper run 57 of the belt 56. Idler pulley 59 and springs 60 serve the same function as idler pulley 19 and springs 20.

A pair of side members 61, one of which is shown broken away in FIG. 1, extend outwardly of the lower run 58 of belt 56, and are secured to the frame 10. The side members 61 are opposite the lower run 58 and have a plurality of slots 62 therein, these slots being vertically extending and are in paired relationship on the two side members 61. Rollers 63 rest on the upper side of lower run 58, and have their ends in the slots 62 in the side members 61. It will thus be seen that the rollers exert a constant force downwardly on the lower run 58 but due to the mounting of their ends in the slots 62, the rollers 63 may move vertically as necessary.

A source of power 65, such as an electric motor, is positioned beneath the frame 10 and has a drive chain 56 secured between it and the crank 45 to cause rotation of the latter. A second drive chain 67 extends upwardly to drive the pulley 14, and a drive chain 68 extends about a sprocket 69 secured to the pulley 14 in known manner and engages with a sprocket 70 to drive the pulley 54. Sprockets 71 and 72 journalled in the upper part of the frame 10 help support the drive chain 68.

In FIG. 5, there is shown a container 75 filled with charcoal briquettes 76. Container 75 has a generally square bottom and outwardly and upwardly flaring side walls and upper rim 77. Also, there is within the container an upwardly extending chimney 78, and it is between the chimney 78 and the walls of the container 75 that the charcoal 76 is placed. It will be understood that a predetermined weight of charcoal 76 is placed in the container 75 and that usually the charcoal 76, at least in part, will extend above the plane of the rim 77 of the container 75.

When it is desired to settle the charcoal 76 below the level of the upper rim 77 of the container 75, the filled container 75 is placed on the upper run 17 of the conveyor belt 16, and any pieces of charcoal 76 extending above the rim 77 will be contacted by the lower surface of the lower run 58 of the belt 56, as is clearly shown in FIG. 6. The source of power is energized and the container 75 will be carried along on the upper run 17 of the conveyor belt 16 and will be caused to oscillate in a generally vertical direction because of the oscillation of the plates 21 and 22. It will be apparent that rotation of the crank 45 will cause reciprocation of the links 42, which in turn will cause reciprocation of the ends 27 and 28 of the plates 21 and 22, and this will cause the plates 21 and 22 to oscillate about the shafts 11 and 12, respectively. As a container travels along the path defined by the upper run 17 of conveyor belt 16, it will be subjected to generally vertical oscillations which at first increase in amplitude until the container is above the free ends 27 and 28 of the plates 21 and 22, and then as the container 17 progresses along and above the plate 22 from the free end thereof to the end having the bracket 24, the oscillations will decrease in amplitude. In addition, while the container 75 is being supported, moved and oscillated as above described, the under surface of the lower run 58 of the belt 56 will engage and exert a substantially constant force on the top of any charcoal 76 extending above the upper rim 77 of the container 75. The force exerted is, of course, due in part to the rollers 63 which, due to their mounting in the slots 62 in the side members 61, will be able to yield to accommodate the oscillations of the container 75 as it progresses along with the conveyor belt 16.

The above described apparatus and method are effective to vibrate the container 75 filled with a predetermined weight of charcoal 76 so as to settle the charcoal 76 below the upper rim 77 of the container 75 without spilling any of the charcoal 76 from the container 75.

It will be obvious to those skilled in the art that various changes may be made without departing from the spirit of the invention and therefore the invention is not limited to what is shown in the drawings and described in the specification, but only as indicated in the appended claims.

What is claimed is:

1. Apparatus to settle material in a container comprising a frame, first and second horizontal shafts in said frame, first and second pulleys journalled on said shafts, respectively, a first conveyor belt trained over said pulleys and having upper and lower runs, an idler pulley on the lower run of said first belt and a spring secured to said idler pulley and to said frame below said lower run to take up slack in said first conveyor belt, first and second plates underlying and supporting the upper run of said first belt, each of said plates having a depending bracket at one end thereof, each of said brackets being mounted on one of said shafts for pivotal movement thereabout, said plates having free ends in facing relationship approximately midway between said shafts, fittings secured to each of said plates at the free end thereof, said fittings underlying said ends and having slots in the outer ends thereof, a pin extending through said slots, a link having its upper end journalled to said pin, a crank underlying said fittings and having the lower end of said link journalled thereto, whereby upon rotation of said crank said plates will be caused to oscillate about said shafts, third and fourth shafts in said frame above said first and second shafts, third and fourth pulleys journalled on said third and fourth shafts, respectively, a second belt trained over said third and fourth pulleys, a second idler pulley underlying the upper run of said second belt and a spring secured to said second idler pulley and to said frame above the upper run of said second belt to take up slack in said second belt, a pair of side members on said frame extending outwardly of the lower run of the second belt and opposite thereto, a plurality of spaced vertically extending paired slots in said side members, rollers on the upper side of the lower run of the second belt having their ends in said slots in said side members, and means to rotate said crank, at least one of said first and second pulleys and at least one of said third and fourth pulleys.

2. Apparatus to settle material in a container comprising a frame, first and second horizontal shafts in said frame, first and second pulleys journalled on said shafts, respectively, a first conveyor belt trained over said pulleys and having upper and lower runs, idler pulley means on the lowest run of said first belt to take up slack in said first conveyor belt, first and second plates underlying and supporting the upper run of said first belt, each of said plates having a depending bracket at one end thereof, each of said brackets being mounted on one of said shafts for pivotal movement thereabout, said plates having free ends in facing relationship approximately midway between said shafts, fittings secured to each of said plates at the free end thereof, said fittings underlying said ends and having slots in the outer ends thereof, a pin extending through said slots, a link having its upper end journalled to said pin, a crank underlying said fittings and having the lower end of said link journalled thereto, whereby upon rotation of said crank said plates will be caused to oscillate about said shafts, third and fourth shafts in said frame above said first and second shafts, third and fourth pulleys journalled on said third and fourth shafts, respectively, a second belt trained over said third and fourth pulleys, second idler pulley means underlying the upper run of said second belt to take up slack in said second belt, a pair of side members on said frame extending outwardly of the lower run of the second belt and opposite thereto, a plurality of spaced vertically extending paired slots in said side members, rollers on the upper side of the lower run of the second belt and having their ends in said slots in said side members, and means to rotate said crank, at least one of said first and second pulleys and at least one of said third and fourth pulleys.

3. Apparatus to settle material in a container comprising a frame, first and second horizontal shafts in said frame, first and second pulleys journalled on said shafts, respectively, a first conveyor belt trained over said pulleys and having upper and lower runs, idler pulley means on the lower run of said first belt to take up slack in said first conveyor belt, first and second plates underlying and supporting the upper run of said first belt, each of said plates having a bracket at one end thereof, each of said brackets being mounted on one of said shafts for pivotal movement thereabout, said plates having free ends in facing relationship, fittings secured to each of said plates at the free end thereof, said fittings underlying said ends and having slots in the outer ends thereof, a pin extending through said slots, a link having its upper end journalled to said pin, a crank underlying said fittings and having the lower end of said link journalled thereto, whereby upon rotation of said crank said plates will be caused to oscillate about said shafts, third and fourth shafts in said frame above said first and second shafts, third and fourth pulleys journalled on said third and fourth shafts, respectively, a second belt trained over said third and fourth pulleys, second idler pulley means underlying the upper run of said second belt to take up slack in said second belt, a pair of side members on said frame extending outwardly of the lower run of the second belt and opposite thereto, a plurality of spaced vertically extending paired slots in said side members, rollers on the upper side of the lower run of the second belt and having their ends in said slots in said side members, and means to rotate said crank, at least one of said first and second pulleys and at least one of said third and fourth pulleys.

4. Apparatus to settle material in a container comprising a frame, first and second horizontal shafts in said frame, first and second pulleys journalled on said shafts, respectively, a first conveyor belt trained over said pulleys and having upper and lower runs, idler pulley on the lower run of said first belt to take up slack in said first conveyor belt, first and second plates underlying and supporting the upper run of said first belt, means pivotally mounting each of said plates on one of said shafts for pivotal movement thereabout, said plates having free ends in facing relationship, fittings secured to each of said plates at the free end thereof, said fittings underlying said ends and having slots in the outer ends thereof, a pin extending through said slots, a link having its upper end journalled to said pin, a crank underlying said fittings and having the lower end of said link journalled thereto, whereby upon rotation of said crank said plates will be caused to oscillate about said shafts, third and fourth shafts in said frame above said first and second shafts, third and fourth pulleys journalled on said third and fourth shafts, respectively, a second belt trained over said third and fourth pulley, second idler pulley means underlying the upper run of said second belt to take up slack in said second belt, a pair of side members on said frame extending outwardly of the lower run of the second belt and opposite thereto, a plurality of spaced vertically extending paired slots in said side members, rollers on the upper side of the lower run of the second belt and having their ends in said slots in said side members, and means to rotate said crank, at least one of said first and second pulleys and at least one of said third and fourth pulleys.

5. Apparatus to settle material in a container comprising a frame, first and second horizontal shafts in said frame, first and second pulleys journalled on said shafts, respectively, a first conveyor belt trained over said pulleys and having upper and lower runs, idler pulley means on the lower run of said first belt to take up slack in said first conveyor belt, first and second plates underlying and supporting the upper run of said first belt, means pivotally mounting each of said plates on one of said shafts for pivotal movement thereabout, said plates having free ends in facing relationship, means to cause said plate to oscillate about said shafts, third and fourth shafts in said frame above said first and second shafts, third and fourth pulleys journalled on said third and fourth shafts, a second belt trained over said third and fourth pulleys, second idler pulley means underlying the upper run of said second belt to take up slack in said second belt, a pair of side members on said frame extending outwardly of the lower run of the second belt and opposite thereto, a plurality of spaced vertically extending paired slots in said side members, rollers on the upper side of the lower run of the second belt and having their ends in said slots in said side members, and means to rotate at least one of said first and second pulleys and at least one of said third and fourth pulleys.

6. Apparatus to settle material in a container comprising a frame, first and second pulleys journalled on said frame, a first conveyor belt trained over said pulleys and having upper and lower runs, first and second plates underlying and supporting the upper run of said first conveyor belt and journalled to said frame at the outer ends thereof, said plates having free ends in facing relationship, means to cause said plates to oscillate about their outer ends, third and fourth pulleys journalled on said frame above said first and second pulleys, a second belt trained over said third and fourth pulleys, a pair of side members on said frame extending outwardly of the lower run of the second belt and opposite thereto, a plurality of spaced vertically extending paired slots in said side members, rollers on the upper side of the lower run of the second belt and having their ends in said slots in said side members, and means to rotate at least one of said first and second pulleys and at least one of said third and fourth pulleys.

7. Apparatus to settle material in a container comprising a frame, first and second pulleys journalled on said frame, a first conveyor belt trained over said pulleys and having upper and lower runs, first and second plates underlying and supporting the upper run of said first conveyor belt and journalled to said frame at the outer ends thereof, said plates having free ends in facing relationship, means to cause said plates to oscillate about their outer ends, third and fourth pulleys journalled on said frame above said first and second pulleys, a second belt trained over said third and fourth pulleys, a plurality of rollers on the upper side of the lower run of the second belt, means to guide said rollers for vertical displacement, and means to rotate at least one of said first and second pulleys and at least one of said third and fourth pulleys.

8. A method of filling and settling pillow-shaped articles into a container which comprises filling said container with a predetermined amount of said articles with a portion thereof extending above the upper rim of said container, supporting said container from the bottom and moving said container along a generally horizontal path, oscillating said container in the vertical direction through oscillations of successively increasing and then decreasing amplitudes while moving it along said generally horizontal path, and exerting a substantially constant force on the top of the articles extending above the upper rim of said container while said container is being so supported, moved and oscillated.

9. A method of filling and settling pillow-shaped articles into a container which comprises filling said container with a predetermined amount of said articles with a portion thereof extending above the upper rim of said container, supporting said container from the bottom and moving said container along a generally horizontal path, oscillating said container in the vertical direction while moving it along said generally horizontal path, and exerting a substantially constant force on the top of the articles extending above the upper rim of said container while said container is being so supported, moved and oscillated.

10. A method of filling and settling pillow-shaped articles into a container which comprises filling said container with a predetermined amount of said articles with a portion thereof extending above the upper rim of said container, supporting said container and moving said container along a generally horizontal path, oscillating said container in the vertical direction while moving it along said generally horizontal path, and exerting a substantially constant force on the top of the articles extending above the upper rim of said container while said container is being so supported, moved and oscillated.

11. A method of filling and settling pillow-shaped articles into a container which comprises filling said container with a predetermined amount of said articles with a portion thereof extending above the upper rim of said container, supporting said container and moving said container along a generally horizontal path, oscillating said container in the vertical direction while moving it along said generally horizontal path, and exerting a force on the top of the articles extending above the upper rim of said container while said container is being so supported, moved and oscillated.

12. A method of filling and settling pillow-shaped articles into a container which comprises filling said container with a predetermined amount of said articles with a portion thereof extending above the upper rim of said container, moving said container along a generally horizontal path, oscillating said container in the vertical direction while moving it along said generally horizontal path, and exerting a force on the top of the articles extending above the upper rim of said container while said container is being so moved and oscillated.

13. A method of filling and settling pillow-shaped articles into a container which comprises filling said container with a predetermined amount of said articles with a portion thereof extending above the upper rim of said container, moving said container along a generally horizontal path, oscillating said contained in the vertical direction while moving it along said generally horizontal path, and exerting a substantially constant force on the articles extending above the upper rim of said container while said container is being so moved and oscillated.

14. A method of filling and settling pillow-shaped articles into a container which comprises filling said container with a predetermined amount of said articles with a portion thereof extending above the upper rim of said container, moving said container along a path, oscillating said container in the vertical direction while moving it along said path, and exerting a substantially constant force on the articles extending above the upper rim of said container while said container is being so moved and oscillated.

References Cited in the file of this patent

UNITED STATES PATENTS

| | | |
|---|---|---|
| 328,439 | Tickle et al. | Oct. 13, 1885 |
| 737,054 | Anderson et al. | Aug. 25, 1903 |
| 1,826,926 | Cundall | Oct. 13, 1931 |
| 1,914,262 | Kronquest | June 13, 1933 |
| 2,379,230 | Griffin | June 26, 1945 |
| 2,675,154 | Fishburne | Apr. 13, 1954 |
| 2,775,987 | Bohlman et al. | Jan. 1, 1957 |